No. 723,661. PATENTED MAR. 24, 1903.
D. A. EVANS.
DENTAL CABINET.
APPLICATION FILED JULY 23, 1902.
NO MODEL. 3 SHEETS—SHEET 1.

Fig. 1.

Witnesses,
Robert Everett,
H. B. Keefer

Inventor,
Daniel A. Evans,
By James L. Norris.
Att'y.

No. 723,661. PATENTED MAR. 24, 1903.
D. A. EVANS.
DENTAL CABINET.
APPLICATION FILED JULY 23, 1902.
NO MODEL. 3 SHEETS—SHEET 2.
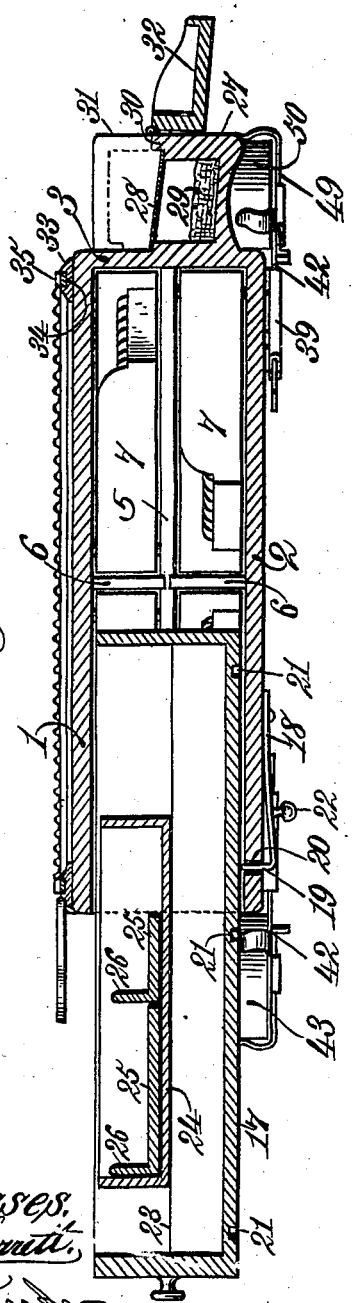
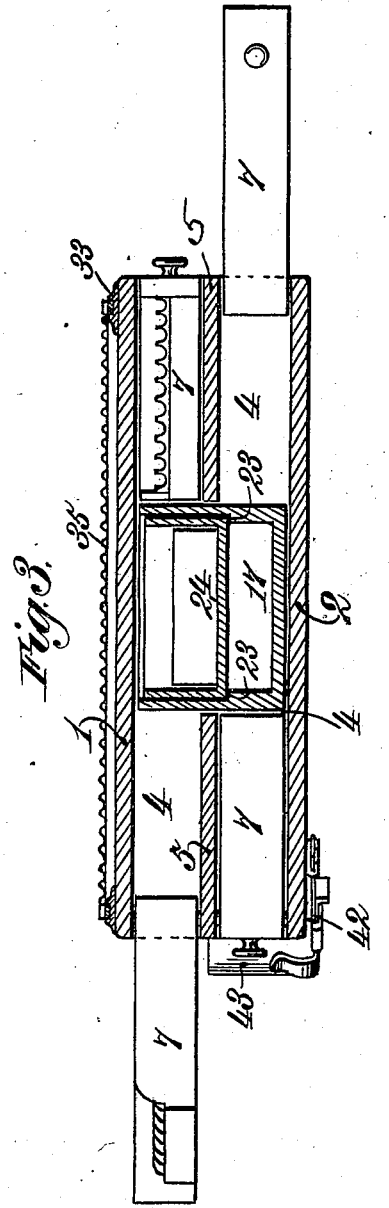
Witnesses.
Inventor.
Daniel A. Evans.

No. 723,661. PATENTED MAR. 24, 1903.
D. A. EVANS.
DENTAL CABINET.
APPLICATION FILED JULY 23, 1902.
NO MODEL. 3 SHEETS—SHEET 3.
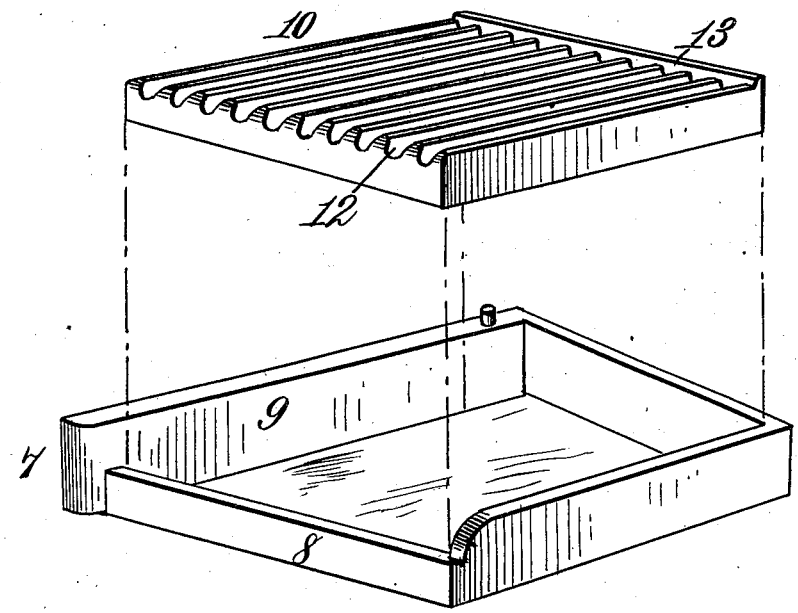
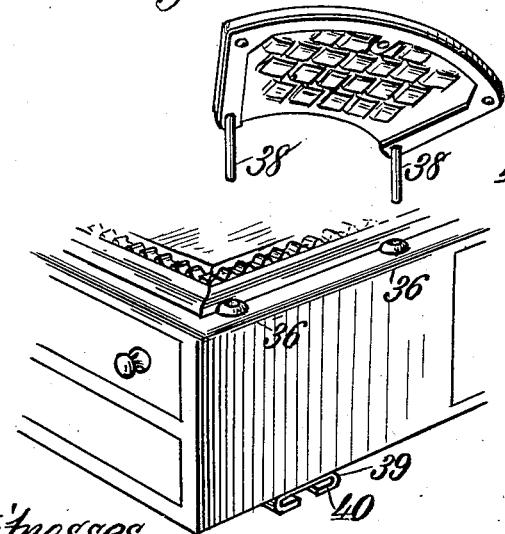
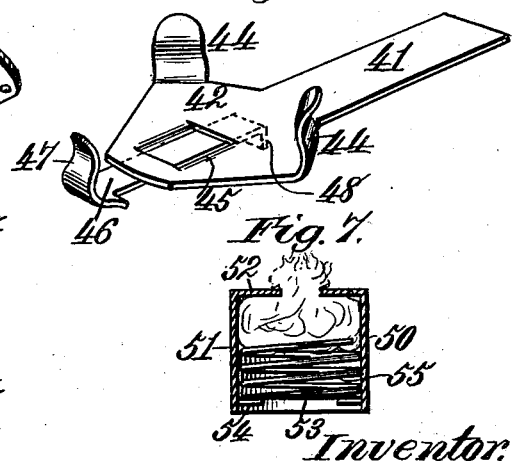
Witnesses
Robert Everett
L. B. Keefer
Inventor
Daniel A. Evans,
By James L. Norris.
Atty.

UNITED STATES PATENT OFFICE.

DANIEL A. EVANS, OF ASHLEY, PENNSYLVANIA.

DENTAL CABINET.

SPECIFICATION forming part of Letters Patent No. 723,661, dated March 24, 1903.

Application filed July 23, 1902. Serial No. 116,683. (No model.)

*To all whom it may concern:*

Be it known that I, DANIEL A. EVANS, a citizen of the United States, residing at Ashley, in the county of Luzerne and State of Pennsylvania, have invented new and useful Improvements in Dental Cabinets, of which the following is a specification.

This invention relates to dental cabinets, and has for its object to provide a cabinet of the type referred to which will be capable of holding all the instruments ordinarily employed by dentists, which will be compact and convenient, which will afford ready access to all the different compartments and the implements stored therein, and which will hold the tools in such manner that any one of the tools or instruments may be instantly selected and removed from the cabinet.

It also has for its object to provide other novel features, which will hereinafter appear.

To these ends my invention consists in the features and in the construction, combination, and arrangement of parts hereinafter described, and particularly pointed out in the claims following the description, reference being had to the accompanying drawings, forming a part of this specification, wherein—

Figure 1 is a top plan view, partially in section, showing the various compartments in their open positions. Fig. 2 is a vertical sectional view taken on the line 2 2 of Fig. 1. Fig. 3 is a vertical sectional view taken on the line 3 3 of Fig. 1. Fig. 4 is a detail perspective view of one of the swinging drawers, showing the tray removed therefrom. Fig. 5 is a similar view of the platinum annealing-tray and a portion of the cabinet, and Fig. 6 is a detail perspective view of one of the supporting-brackets. Fig. 7 is a vertical sectional view of the cotton-holder.

My improved cabinet comprises a frame or casing consisting of a top 1 and bottom 2, united on two of its opposite sides by end walls 3. In the two other sides are a plurality of cells or compartments 4, formed by horizontal transverse partitions 5 and vertical partitions 6, which are attached to the top and bottom of the frame or casing and to the horizontal partitions 5. Arranged in the cells or compartments 4 are swinging drawers 7, each consisting of a tray open at its top and pivoted at one of its ends, as at 7ª, to the top and bottom of the cabinet and to one of the horizontal partitions 5. The free end of each of said swinging drawers is inclined or beveled, as at 8, to permit the drawer being readily swung in and out of its cell or compartment, the inclined end 8 of the drawer being arranged at a point in rear of the free end of the front wall of the box, as shown, and for the purpose hereinafter explained. Arranged in each of the swinging drawers 7 is a removable tray 10, comprising a block, preferably of wood, having a series of longitudinal parallel grooves or corrugations 12 formed in its upper side. The opposite ends of the tray are beveled or inclined to correspond to the beveled or inclined end 8 of the drawer. The rear ends of the corrugations 12 are closed by a vertical wall 13, attached to or formed with the tray. The grooves or corrugations 12 are designed for the reception of dental instruments, the ends of which are adapted to project over the front walls 8 of the drawer so as to be readily grasped by the fingers of the operator. By inclining the rear end of the tray to correspond to the inclination of the front end thereof and the inclined end 8 of the drawer all the instruments are caused to project an equal distance over such inclined end 8, whereby each may be readily grasped and whereby any of the instruments is prevented from projecting beyond the free end of the front 9 of the drawer, which would have the effect of preventing the drawer from being closed. By making the trays removable the entire set of instruments may be simultaneously removed from the drawer if it should be so desired, and the trays may also be removed for the purpose of cleaning out the drawers. One or more of the trays may be provided at its rear end with a solid extension 14, provided on its upper side with a plurality of cup-shaped depressions or pockets 15 for the reception of material used in filling and treating teeth and the like.

It will be noted that the swinging drawers are arranged in tiers one above the other, two vertical and two horizontal tiers being shown in the drawings as being arranged in both the open sides of the cabinet. The two drawers in each vertical tier are arranged to swing in opposite directions, whereby all of the drawers may be swung open, and when in such open position the trays will present the implements contained therein to the operator in such manner that any one or more of such implements may be selected and removed from one tray without necessitating the opening or closing of the other tray. As shown, the partitions 5 and 6, forming the cells containing the drawers, each extend only about one-third the distance transversely of the cabinet, whereby a space 16 is formed centrally in the cabinet between the drawers and said partitions, and in said space is fitted a sliding drawer 17. Said drawer preferably occupies when closed the entire extent of said space and is guided in its movement by the inner edges of the partitions 5 and 6.

Attached to the under side of the bottom 2 of the cabinet is a catch consisting of a strip 18 of resilient metal attached at its inner end to the bottom 2 and bent up at its outer end at a right angle to the body of the catch to form a detent 19, which projects through the slot 20, formed in the bottom 2. Formed in the under side of the drawer 17 is a slot or mortise 21, which when the drawer is entirely closed receives the detent 19 and holds the drawer locked. The catch is provided on its under side with a knob 22, so that when it is desired to unlock the drawer said knob may be grasped by hand and the detent retracted from the slot 21 in the drawer, after which the latter may be withdrawn or opened. The drawer 17 is intended for the reception of various implements and materials which are not otherwise provided for in the cabinet.

Attached to the inner and lower sides of the drawer 17 are cleats 23, on which is supported a sliding tray 24. The tray 24 is of considerable less length than the drawer, so that by sliding said tray back and forth on the cleats access may be freely had to either end of the drawer. Removably arranged in the tray 24 are false bottoms 25 of unequal length, each of said false bottoms being provided at one end with a vertical wall 26. By moving said false bottoms toward or from one another or by reversing one or more of them the tray may be formed into different shaped and sized compartments to suit the needs or the individual preference of the operator.

Attached to the opposite side of the cabinet is a trough 27, provided near its upper end with a horizontal perforated partition 28, preferably formed of sheet metal. The perforations are intended for the reception of the shanks of drills, grinding and polishing disks, and the like, and arranged in the bottom of said trough is a pad 29, of felt or other similar material, on which the ends of said drills rest, the purpose of the pad being to prevent the ends of the drills and such tools from being upset or injured when the tools are directed in place in the perforations. The upper portion of the front 30 of the trough is cut away, as at 31, and pivoted to the upper edge of the front 30 is a cover 32, substantially triangular in cross-section, as shown, whereby when the cover is swung open and down it constitutes a tray for the temporary reception of the drills, disks, and similar implements.

The top 1 of the cabinet is provided on each of its upper sides with a marginal ledge consisting of beads or moldings 33, which are fixed to the upper sides of the top 1 in close proximity to the edges of the latter. Each of the moldings 33 is provided on its upper sides with a longitudinal groove 34, in which is fitted a corrugated strip 35, the corrugated edges of the strip projecting beyond the upper edges of the moldings 33. Various instruments may be laid on the top of the cabinet in such manner that the ends of the latter rest on the corrugated strips and project beyond the edges of the cabinet, so that they may be conveniently selected and removed by the operator, the said implements resting in the grooves or corrugations of the strips, whereby they are held separated from one another and prevented from being accidentally displaced, and for this purpose said corrugated strips are preferably formed of rubber; but it is evident that they may be made of other material.

Fitted in the upper edge of the center of the sides of the top 1 are two metallic sockets or bushings 36, and arranged to be removably fitted in said sockets is a tray for annealing gold and other similar material employed in filling teeth. Said tray comprises a sheet of metal having stamped or otherwise formed in its upper side a plurality of cells or depressions 37, and to the inner edge portion of said tray are rigidly fixed two depending pins 38, that are adapted to be removably fitted in the said sockets or bushings and hold the tray horizontally in place, as shown.

Attached to the under side of the bottom 2 of the cabinet is a guideway consisting of a metallic strip 39, provided at its opposite edges with underturned flanges 40, and adapted to be removably fitted in said guideway is a lamp-support comprising a rectangular metallic strip 41, which is slidably arranged in said guideway and terminates at its outer end in a substantially triangular-shaped head 42, which forms a base or seat for an alcohol-lamp 43. The head 42 is provided with two upwardly-struck fingers 44, and has struck up on its under side a stirrup 45. Adjustably arranged between said stirrup and the under side of the head 42 is a metallic strip 46, provided at one end with a vertically-projecting finger 47, and is bent vertically downward at its other end, as at 48, to form a stop. The lamp rests on the head 42 and is embraced by the said fingers, and by adjusting the shank of the outermost finger in the stirrup the lamp-support is adapted to hold lamps of different sizes. The lamp is supported directly beneath the gold-heating pan or tray, and by placing the gold or other filling material to be heated in the cells of said tray and placing the lamp beneath the tray the gold may be conveniently heated preparatory to being placed in the cavity of the tooth to be filled. When the tray and lamp are not in use, they may be detached from the cabinet and stored in the drawer 17, before referred to.

A support 49, similar in all respects to the lamp-support above described, is removably attached to the under side of the cabinet and serves to support a cotton-holder 50, comprising a cylindrical casing 51, having a centrally-apertured top 52 and provided with a loose bottom 53, resting on pins 54, that project inwardly from the lower edge of the cylindrical casing. A spiral spring 55 is inclosed within the cylindrical casing and rests on the removable bottom. By removing the bottom from the casing and also removing the spiral spring the casing may be filled with absorbent cotton and the bottom restored to place. The spring operates to feed the cotton up through the central opening in the top of the casing, where it may be readily grasped by hand and such portions as may be desired may be easily detached by the operator as needed.

In practice the cabinet is rotatably mounted on the end of the swinging and adjustable folding bracket, such as is usually employed in dental offices for such purpose; but it will be readily understood that it may be mounted on a pedestal or other suitable support.

Instead of removably mounting the lamp-support and cotton-holder as above described it is obvious that the same may be screwed or otherwise permanently secured to the under side of the cabinet.

Having now described my invention, what I claim is—

1. A dental cabinet comprising a casing provided with a continuous marginal flange having a groove therein, and a corrugated rubber strip arranged in said groove and projecting above the said flange, substantially as and for the purpose specified.

2. In a dental cabinet, the combination with a hollow casing, of a swinging drawer pivoted at one end in one side of said casing and beveled at its free end, and a removable tray fitted in said drawer and provided on its upper side with a plurality of parallel, longitudinal grooves or corrugations, said tray being provided at its rear end with an upwardly-projecting wall, and at its front end projecting above the adjacent edge of the drawer, substantially as and for the purpose set forth.

3. In a dental cabinet, the combination with a hollow casing, of a swinging drawer pivoted at one end in one side of said casing and beveled at its free end, and a tray fitted in said drawer and provided on its upper side with a plurality of parallel longitudinal corrugations, said tray being provided at its rear end with an extension provided on its upper side with a plurality of cup-shaped depressions, substantially as and for the purpose set forth.

4. The combination with a dental cabinet, of a sliding drawer arranged therein, a sliding tray arranged within said drawer, and a plurality of false bottoms arranged in said sliding tray, each of said false bottoms being provided at one end with an upwardly-projecting wall, substantially as described.

In testimony whereof I have hereunto set my hand in presence of two subscribing witnesses.

DANIEL A. EVANS.

Witnesses:
JOHN P. POLLOCK,
JOHN C. SWEENEY.